US011831258B2

(12) United States Patent
Xu et al.

(10) Patent No.: US 11,831,258 B2
(45) Date of Patent: Nov. 28, 2023

(54) SAFE-TORQUE-OFF (STO) CIRCUIT AND FREQUENCY CONVERTER INCLUDING THE SAME

(71) Applicant: Zhejiang Holip Electronic Technology Co., Ltd, Zhejiang (CN)

(72) Inventors: Xiaoran Xu, Beijing (CN); Liang Xiao, Nordborg (DK)

(73) Assignee: Zhejiang Holip Electronic Technology Co., Ltd., Zhejiang (CN)

( * ) Notice: Subject to any disclaimer, the term of this patent is extended or adjusted under 35 U.S.C. 154(b) by 123 days.

(21) Appl. No.: 17/377,619

(22) Filed: Jul. 16, 2021

(65) Prior Publication Data

US 2022/0021324 A1 Jan. 20, 2022

(30) Foreign Application Priority Data

Jul. 20, 2020 (CN) .......................... 202010701206.2
Jun. 2, 2021 (CN) .......................... 202110617526.4

(51) Int. Cl.
*H02P 7/00* (2016.01)
*H02P 27/04* (2016.01)
(Continued)

(52) U.S. Cl.
CPC ........... *H02P 27/04* (2013.01); *H02H 7/0833* (2013.01); *H02P 3/06* (2013.01)

(58) Field of Classification Search
CPC . H02P 27/06; H02P 3/06; H02P 27/04; H02H 7/0833
(Continued)

(56) References Cited

U.S. PATENT DOCUMENTS

2013/0231767 A1* 9/2013 Sabapathy .......... G06F 11/0796
700/95
2014/0111128 A1* 4/2014 Hensel ..................... G05B 9/02
318/400.21
(Continued)

FOREIGN PATENT DOCUMENTS

CN 105449638 B 3/2016
CN 107665009 A 2/2018
(Continued)

OTHER PUBLICATIONS

Xiaoquan Chen at al., "Design of Safe Torque Off Module Based on MCU," Process Automation Instrumentation, vol. 41 No. 6, Jun. 2020.

*Primary Examiner* — Kawing Chan
*Assistant Examiner* — Gabriel Agared
(74) *Attorney, Agent, or Firm* — McCormick, Paulding & Huber PLLC

(57) ABSTRACT

A circuit with a Safe-Torque-Off (STO) functionality and a frequency converter including the same are provided. According to embodiments, the circuit may include a first STO channel configured to control on/off of power supply to a high-side driver of a frequency converter based on a first STO signal, a second STO channel configured to control on/off of power supply to a low-side driver of the frequency converter based on a second STO signal, and a third STO channel configured to control supply of a drive control signal from a controller of the frequency converter to the high-side driver and the low-side driver based on a result of a logical operation of the first STO signal and the second STO signal, wherein the logical operation is configured to make the result active in response to at least one of the first and second STO signals being active.

18 Claims, 9 Drawing Sheets

(51) Int. Cl.
*H02H 7/08* (2006.01)
*H02P 3/06* (2006.01)

(58) Field of Classification Search
USPC .......................................................... 318/445
See application file for complete search history.

(56) References Cited

U.S. PATENT DOCUMENTS

| | | | | |
|---|---|---|---|---|
| 2014/0159597 | A1* | 6/2014 | Sun | H05B 45/46 |
| | | | | 315/193 |
| 2014/0253008 | A1* | 9/2014 | Sykes | H02H 3/24 |
| | | | | 318/494 |
| 2019/0068088 | A1* | 2/2019 | Xu | H02P 29/0241 |
| 2020/0403552 | A1* | 12/2020 | Chang | H02M 7/00 |

FOREIGN PATENT DOCUMENTS

| | | | |
|---|---|---|---|
| CN | 108233685 | A | 6/2018 |
| CN | 207884588 | U | 9/2018 |
| CN | 208522667 | U | 2/2019 |
| CN | 109428585 | A | 3/2019 |
| CN | 209642583 | U | 11/2019 |
| CN | 111355428 | A | 6/2020 |
| DE | 10 2018 118 239 | A1 | 2/2019 |
| WO | 2020/201169 | A1 | 10/2020 |

* cited by examiner (e)

SAFE-TORQUE-OFF (STO) CIRCUIT AND FREQUENCY CONVERTER INCLUDING THE SAME

CROSS-REFERENCE TO RELATED APPLICATIONS

This application claims foreign priority benefits under 35 U.S.C. § 119 to Chinese Patent Applications No. 202010701206.2 filed Jul. 20, 2020 and No. 202110617526.4 filed Jun. 2, 2021, each of which is hereby incorporated by reference in its entirety.

TECHNICAL FIELD

The present disclosure relates to electronic circuit, and in particular, to a Safe-Torque-Off (STO) circuit with improved reliability and a frequency converter including the same.

BACKGROUND

At present, a Safe-Torque-Off (STO) circuit is generally in a dual-channel configuration, in which a dynamic detection mechanism or a dynamic power supply is generally used for both channels to improve safety. However, the dynamic detection mechanism is logically complex, and the dynamic power supply must employ a bulky and costly transformer for electrical isolation, which adversely affect design and cost.

SUMMARY

In view of the above, the present disclosure is intended to provide, among others, a Safe-Torque-Off (STO) circuit with improved reliability and a frequency converter including the same.

According to embodiments of the present disclosure, there is provided a circuit with an STO functionality, comprising: a first STO channel configured to control on/off of power supply to a high-side driver of a frequency converter based on a first STO signal; a second STO channel configured to control on/off of power supply to a low-side driver of the frequency converter based on a second STO signal; a third STO channel configured to control supply of a drive control signal from a controller of the frequency converter to the high-side driver and the low-side driver based on a result of a logical operation of the first STO signal and the second STO signal. The logical operation is configured to make the result active in response to at least one of the first and second STO signals being active.

According to embodiments, the power supply to the high-side driver may be stopped in response to active first STO signal. Similarly, the power supply to the low-side driver may be stopped in response to active second STO signal.

The first STO channel may comprise: a first isolation device with a first primary side and a first secondary side, wherein the first primary side is configured to receive the first STO signal; and a first switching device connected between a power supply of the high-side driver and the high-side driver and configured to be turned on or off under control of the first secondary side, wherein the first secondary side is connected in such a manner that the first switching device is turned off in response to active first STO signal. The second STO channel may comprise: a second isolation device with a second primary side and a second secondary side, wherein the second primary side is configured to receive the second STO signal; and a second switching device connected between a power supply of the low-side driver and the low-side driver and configured to be turned on or off under control of the second secondary side, wherein the second secondary side is connected in such a manner that the second switching device is turned off in response to active second STO signal.

The third STO channel may comprise: a third isolation device with a third primary side and a third secondary side, wherein the third primary side is configured to receive the result of the logical operation of the first STO signal and the second STO signal, and wherein the third secondary side is connected in such a manner that the supply of the drive control signal is stopped in response to at least one of the first STO signal and the second STO signal being active.

The third primary side may be connected between the first STO signal and ground to form a current path from the first STO signal to the ground via the third primary side. The circuit may further comprise a switching device arranged in the current path, a control terminal of the switching device being controlled by the second STO signal. For example, the switching device may be connected between the first STO signal and the third primary side, or between the third primary side and the ground.

The circuit may further comprise a gate driver connected to the control terminal of the switching device, wherein operation of the gate driver is controlled by the second STO signal.

Alternatively, the third primary side may be connected between the first STO signal and ground to form a current path from the first STO signal to the ground via the third primary side. The circuit may further comprise a bypass branch in parallel with the current path, the bypass branch being controlled by the second STO signal. For example, the bypass branch may comprise a switching device, a control terminal of the switching device being controlled by the second STO signal.

Alternatively, an output from the third secondary side may be connected to an enable terminal of the controller. For example, the third isolation device may comprise an optocoupler, and the third secondary side has one end connected to a first power supply and the other end connected to a ground voltage through a resistor. An output voltage at the other end is connected to the enable terminal of the controller.

Alternatively, the third STO channel may further comprise a third switching device connected between the controller and the high-side and low-side drivers and configured to be turned on or off under control of the third secondary side. For example, the third switching device may comprise: a first transfer gate connected between the controller and the high-side driver and configured to transfer the drive control signal from the controller to the high-side driver; and a second transfer gate connected between the controller and the low-side driver and configured to transfer the drive control signal from the controller to the low-side driver. An output from the third secondary side is connected to enable terminals of the first transfer gate and the second transfer gate, respectively. For example, the third isolation device may comprise an optocoupler, and the third secondary side has one end connected to a first power supply through a resistor and the other end connected to a ground voltage. An output voltage at the one end is connected to the enable terminals of the first transfer gate and the second transfer gate, respectively.

Alternatively, an output from the third secondary side may be connected to a clock generator configured to provide a clock signal to the controller. The circuit may further comprise a third switching device connected between a power supply of the clock generator and the clock generator and configured to be turned on or off under control of the third secondary side. The third secondary side is connected in such a manner that the third switching device is turned off in response to at least one of the first STO signal and the second STO signal being active.

According to embodiments of the present disclosure, an AND gate may be constituted by discrete components to perform the logical operation.

According to embodiments of the present disclosure, the circuit may further comprise: a first switch configured to control whether or not to input the first STO signal to the first STO channel; a second switch configured to control whether or not to input the second STO signal to the second STO channel; and a third switch configured to control whether or not to ground the circuit.

According to embodiments of the present disclosure, there is provided a frequency converter including the above circuit.

According to embodiments of the present disclosure, there is provided a circuit with a Safe-Torque-Off (STO) functionality, comprising: three STO channels configured to receive a first STO signal, a second STO signal, and a signal obtained by a logical operation of the first STO signal and the second STO signal, respectively, and to control power supply to a high-side driver, power supply to a low-side driver, and supply of a drive control signal in a frequency converter based on the received signals, respectively. The logical operation is configured to make the signal obtained by the logical operation active in response to at least one of the first STO signal and the second STO signal being active, and the drive control signal is provided by a controller of the frequency converter to the high-side driver and the low-side driver.

According to embodiments of the present disclosure, the STO circuit includes three STO channels, each of which can independently stop a motor, resulting in a configuration of "one out of three" (or, 1oo3). In other words, the STO circuit according to embodiments of the present disclosure may tolerate 2 failures while the STO functionality still works, i.e., Hardware Fault Tolerance (or, HFT)=2. Therefore, the frequency converter with the STO circuit may achieve a higher level of safety in a simple and efficient way.

BRIEF DESCRIPTION OF THE DRAWINGS

The above and other objects, features, and advantages of the present disclosure will become more apparent from the following description of embodiments thereof with reference to the drawings, in which.

Throughout the drawings, like or similar reference signs refer to like or similar elements.

DETAILED DESCRIPTION

Hereinafter, embodiments of the present disclosure will be described with reference to the drawings. However, it should be understood that these descriptions are only exemplary and illustrative, and are not intended to limit the present disclosure. In addition, in the following description, descriptions of well-known structures and technologies are omitted herein to avoid unnecessarily obscuring concepts of the present disclosure.

Terminologies used herein are to describe particular embodiments only and are not intended to limit the present disclosure. Words such as "a", "an" or "the" as used herein shall include meanings of "a plurality of" or "multiple", unless expressly indicated otherwise. In addition, terms such as "comprising" or "including" as used herein indicate the presence of stated features, steps, operations, and/or elements, but do not exclude the presence or addition of one or more other features, steps, operations, or elements.

All terms (including technical and scientific terms) used herein shall be of the general meaning understood by the ordinary skilled in the art, unless otherwise defined. It should be noted that the terms used herein shall be interpreted as having meanings consistent with the context of the specification and shall not be interpreted in an ideal or overly formal manner.

Numerals set forth in the specification and claims are approximations that may vary depending upon the desired properties sought to be obtained by the present disclosure, unless expressly indicated otherwise. In particular, all numerals indicating component contents, reaction conditions, or the like used in the specification and claims should be understood as being modified in all instances by the term "about". Generally, the expression is meant to include variations by a particular quantity of, for example, ±10% or more or less in some embodiments.

Ordinal numbers such as "first," "second," and "third" in the specification and claims preceding an element do not by itself connote any ordinal number of the element, nor the order in which the element is sequenced with another element or in a method of manufacture or importance thereof. The use of ordinal numbers only serves to clearly distinguish one element having a certain name from another element having the same name.

Figure 1:
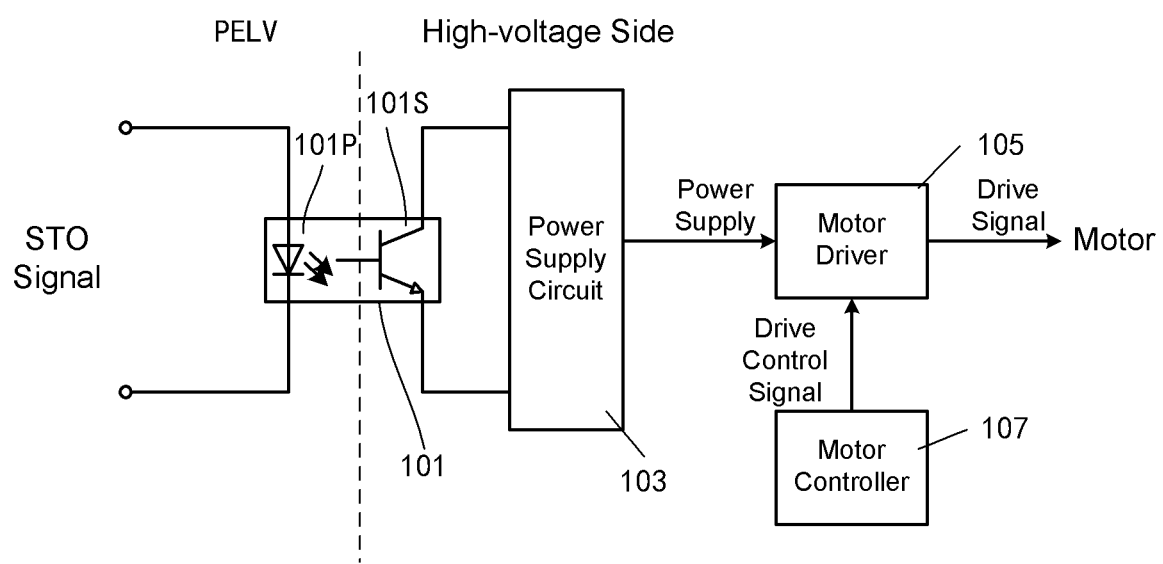
FIG. 1 is a block diagram schematically illustrating a circuit with an STO functionality.

FIG. 1 is a block diagram schematically illustrating a circuit with an STO functionality.

The circuit diagram schematically illustrates signal flows and schematic connections in controlling a motor by a frequency converter. As shown in FIG. 1, the circuit may be divided into a low-voltage (e.g., a protection extra low voltage (PELV)) side and a high-voltage side based on levels of operating voltages and also for safety considerations. The low-voltage side is generally directed to operations at low voltages, such as various control signals; while the high-voltage side is generally directed to operations at high voltages, such as power supply to a load (e.g., a motor). For the sake of electrical safety, there is generally an electrical isolator, such as an optocoupler 101, provided between the low-voltage side and the high-voltage side. The optocoupler 101 can achieve electrical isolation between the low-voltage side and the high-voltage side on the one hand, and can optically transfer control from the low-voltage side to the high-voltage side on the other hand. In the following description, the optocoupler is described as an example of the electrical isolator. However, it should be understood that the present disclosure is not limited thereto. For example, components such as a capacitive coupler, a magnetic coupler or the like, which can achieve electrical isolation and also signal transfer between the low-voltage side and the high-voltage side, are also possible.

Specifically, the optocoupler 101 may include a primary side 101P and a secondary side 101S. The primary side 101P may be in the form of a Light Emitting Diode (LED) that is turned on or off in response to an STO signal received at a signal input. Generally, the STO signal is in an "inactive" state at a high level (e.g., about 24V), indicating that the motor is operating normally without having to be stopped, and is in an "active" state at a non-high level (e.g., a low voltage such as 0V or an open state), indicating that the motor is to be stopped. Here, the "high level" refers to a voltage that can effectively turn on the LED on the primary side 101P of the optocoupler 101, and the "non-high level" refers to a voltage that keeps the LED on the primary side 101P of the optocoupler 101 off. For example, when the STO signal is at a high level (resulting in a voltage across the LED being greater than an ON voltage of the LED), the LED may be turned on to emit light therefrom. When the STO signal is enabled (e.g., at a low level or in an open state) to be active, the LED may be turned off. The secondary side 101S may be in the form of a transistor, with a base receiving an optical signal emitted by the LED of the primary side 101P. More specifically, the transistor of the secondary side 101S may be turned on when the LED of the primary side 101P is turned on and emits light, or turned off when the LED of the primary side 101P is turned off and does not emit light.

The secondary side 101S may therefore be turned on or off depending on the STO signal received on the primary side. Such on/off of the secondary side 101S may control power supply of a power supply circuit 103. For example, the power supply circuit 103 may be controlled to supply power to the outside when the transistor on the secondary side 101S is turned on, and to stop supplying power when the transistor on the secondary side 101S is turned off. A motor driver 105, which is powered by the power supply circuit 103, may then operate (with the power) or stop (without the power) based on the STO signal received by the primary side 101P accordingly.

In the optocoupler, the primary side 101P is in the form of a diode and the secondary side 101S is in the form of a transistor, and signals are transferred optically between them. As described above, the present disclosure is not limited thereto. For example, there may be a capacitive coupler in the form of a capacitor, or a magnetic coupler in the form of a transformer. Regardless of the specific form of the electrical isolator, in the present disclosure, the "primary side" refers to one side receiving the STO signal, and the "secondary side" refers to the other side of the electrical isolator, which renders different states (e.g., outputs signals at different levels depending on its connection) based on the high and low levels of the STO signal received by the primary side, and thus may control an output of a circuit connected thereto.

The motor driver 105, with the power supplied from the power supply circuit 103, may operate based on a drive control signal provided by a motor controller 107. Specifically, the motor driver 105 may output a drive signal to the motor based on the drive control signal (for example, a Pulse Width Modulation (PWM) signal, to control rotation/stop, rotation speed, or the like of the motor) provided by the motor controller 107, so as to drive the motor to operate. Generally, the drive control signal, such as a PWM signal, provided by the motor controller 107 is a signal at a low voltage (e.g., about 3.3V). The motor driver 105 may output the drive signal at a high voltage (e.g., about 18V) with the power supplied from the power supply circuit 103. The drive signal corresponds to the drive control signal, and is, for example, a PWM signal having the same waveform as the drive control signal.

The motor driver 105 may provide rotational torque to the motor through switching devices such as Insulated Gate Bipolar Transistors (IGBTs). For a three-phase motor, generally six IGBTs may be provided, three for the high side and three for the low side. The drive signal output by the motor driver 105 may be coupled to gates of the IGBTs, so as to control on/off of the IGBTs. Accordingly, the motor controller 107 may output six drive control signals such as PWM signals for the six IGBTs. The motor driver 105 may include a high-side driver for the high-side IGBTs and a low-side driver for the low-side IGBTs (see, e.g., 305H and 305L in FIG. 2), each of which receives three corresponding ones of the drive control signals from the motor controller 107, and outputs three (gate) drive signals for three corresponding ones of the IGBTs. The rotation speed of the motor may be adjusted by adjusting a duty ratio of the PWM signal.

In the example of FIG. 1, only a single STO channel is illustrated. Dual STO channels may be provided. Generally, the two STO channels are arranged separately, resulting in a redundant configuration. For example, one of them may be used to control the high-side driver for the high-side IGBTs, and the other may be used to control the low-side driver for the low-side IGBTs. Each of them may receive the STO signal separately. When the STO signal to any of the channels is enabled to be active, the corresponding driver may be powered off, thereby stopping driving the corresponding high-side or low-side IGBTs, and thus stopping the motor to implement the STO functionality.

According to an embodiment of the present disclosure, there is provided a three-channel STO configuration. The three channels may each independently output a signal to stop the motor in response to an active STO signal, thereby reducing the risk of failing to stop the motor due to a failure in a single one or two of the channels.

Figure 2:
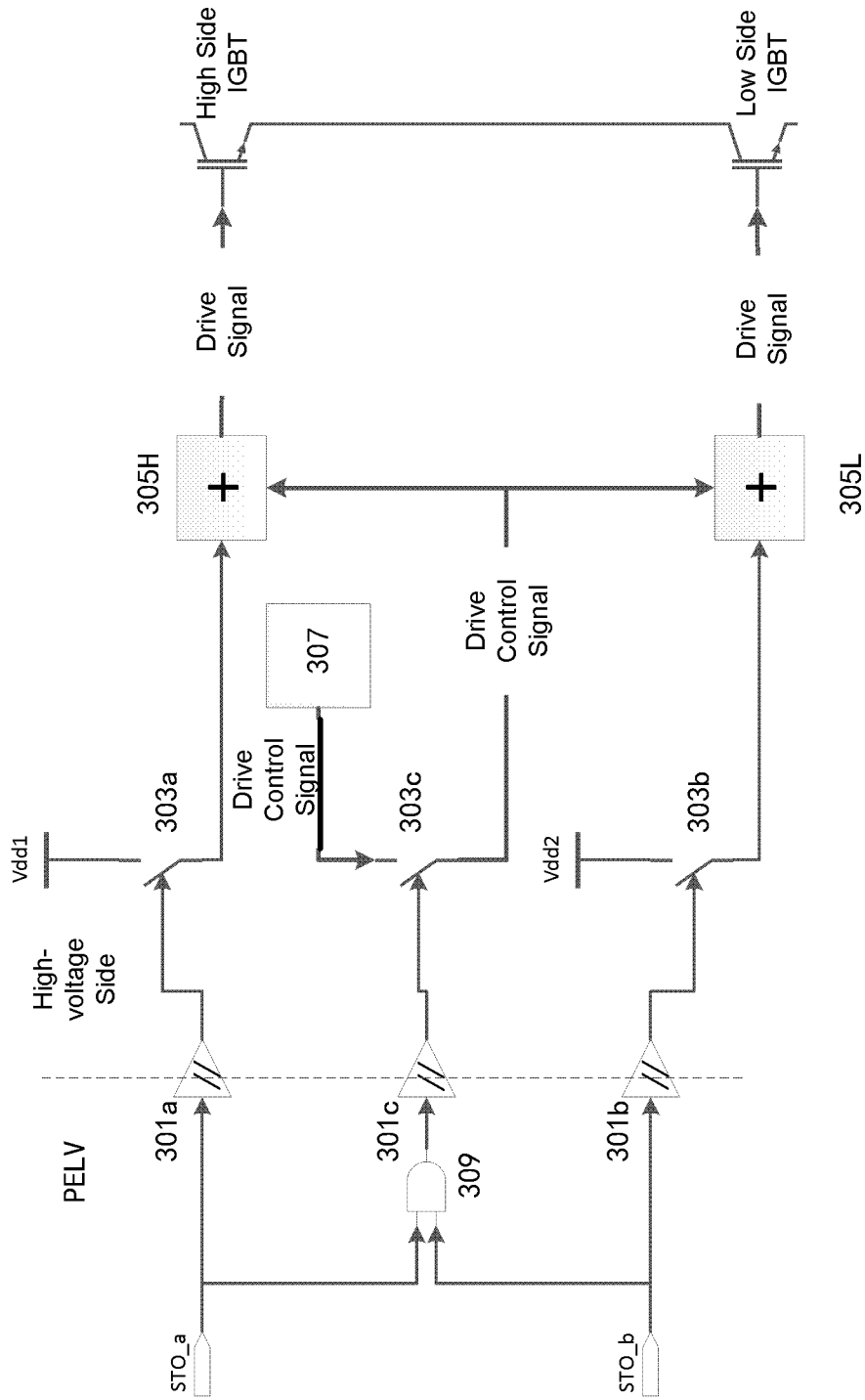
FIG. 2 is a principle diagram schematically illustrating a circuit with an STO functionality according to an embodiment of the disclosure.

FIG. 2 is a principle diagram schematically illustrating a circuit with an STO functionality according to an embodiment of the disclosure.

As shown in FIG. 2, the circuit according to the embodiment has two STO channels (which may be referred to as "a first STO channel" and "a second STO channel", respectively) for a high-side driver 305H and a low-side driver 305L, respectively, which act in response to a first STO signal STO_a and a second STO signal STO_b, respectively. The first STO channel may include a first isolation device 301a, and the second STO channel may include a second isolation device 301b. As described above, the first isolation device 301a and the second isolation device 302a may include components having isolation functions, such as optocouplers, capacitive couplers, magnetic couplers and the like.

The first isolation device 301a may receive the first STO signal STO_a, and have an output to control the operation of the high-side driver 305H by, e.g., cutting off power from a power supply (Vdd 1) to the high-side driver 305H in response to the first STO signal STO_a being active. In this case, a first switching device 303a may be connected between the power supply (Vdd 1) of the high-side driver 305H and the high-side driver 305H, and the output from the first isolation device 301a may control on/off of the first switching device 303a. The second isolation device 301b may receive the second STO signal STO_b, and have an output to control the operation of the low-side driver 305L by, e.g., cutting off power from a power supply (Vdd 2) to the low-side driver 305L in response to the second STO signal STO_b being active. In this case, a second switching device 303b may be connected between the power supply (Vdd 2) of the low-side driver 305L and the low-side driver 305L, and the output from the second isolation device 301b may control on/off of the second switching device 303b.

In the figure, the isolation devices 301a and 301b in the two STO channels are illustrated to control the power supply to the high-side and low-side drivers 305H and 305L through the switching devices 303a and 303b, respectively. However, the present disclosure is not limited thereto. The outputs from the isolation devices 301a and 301b may also be connected to enable terminals of the high-side and low-side drivers 305H and 305L, so as to control the operations of the high-side and low-side drivers 305H and 305L by enabling or disabling the high-side and low-side drivers 305H and 305L. For example, when either or both of the first and second STO signals STO_a and STO_b are enabled (active), the output(s) from the corresponding isolation device(s) may disable the driver(s) on the corresponding side(s) to stop the operation thereof.

The first and second STO channels may each operate as shown in FIG. 1. For example, when either of the first and second STO signals STO_a and STO_b is enabled (active), the corresponding switching device 303a or 303b may cut off the power supply to the corresponding driver 305H or 305L, thereby stopping the driver 305H or 305L from operating.

The circuit may include a third STO channel for a motor controller 307 in addition to the first and second STO channels. The third STO channel may include a third isolation device 301c, an output from which may control the motor controller 307 to provide drive control signals to the high-side and low-side drivers 305H and 305L. For example, a third switching device 303c may be connected between the motor controller 307 and the high-side and low-side drivers 305H and 305L, and the output from the third isolation device 301c may control on/off of the third switching device 303c. It should be understood by the ordinary skilled in the art that the control of providing a signal from a signal source to a component is not limited to the use of a switching device in a transfer path between the signal source (in this example, the motor controller 307) and the component (in this example, the high-side and low-side drivers 305H and 305L). There may be various different methods, for example, a method of controlling the operation of the signal source, or the like. Similarly, the third isolation device 301c may include components having isolation functions, such as optocouplers, capacitive couplers, magnetic couplers and the like.

The third STO channel may act based on the first STO signal STO_a and/or the second STO signal STO_b. Specifically, if either (or both) of the first STO signal STO_a and the second STO signal STO_b is enabled (which means that the motor should be stopped), the third STO channel may also cut off the supply of the drive control signals from the motor driver 307 to the high-side and low-side drivers 305H and 305L by turning off the third switching device 303c. That is, the third STO channel may be enabled in response to either or both of the first and second STO signals STO_a and STO_b being active, which may be implemented by an AND operation between signal levels of the first STO signals STO_a and the second STO signal STO_b. FIG. 2 schematically illustrates an AND gate 309 for implementing the AND operation. It is to be noted that the AND gate 309 is illustrated only in principle to represent a module to perform the AND operation. The AND gate 309 may be implemented in different circuit configurations by, e.g. simply using several discrete components, which will be further explained below with reference to FIG. 6.

In the case where the supply of the drive control signals from the motor driver 307 to the high-side and low-side drivers 305H and 305L are cut off, the high-side and low-side drivers 305H and 305L may generate no corresponding drive signals due to failing to receive the drive control signals, and thus stop driving the motor to rotate. Therefore, in addition to the first STO channel and the second STO channel, the third STO channel is provided as a redundant configuration, which is advantageous for improving reliability and security.

As shown in FIG. 2, the redundant configuration may be achieved by only providing the third isolation device 301c, the AND gate 309, and the switching device 303c, without changing other parts of the circuit. Therefore, it is possible to achieve a higher level of security at relatively small cost (mostly caused by the third isolation device 301c).

There are a variety of implementations of the third STO channel, some of which are described below. In these examples, the optocoupler is described as an example of the electrical isolator for convenience of the description of the operation of the circuit.

Figure 3:
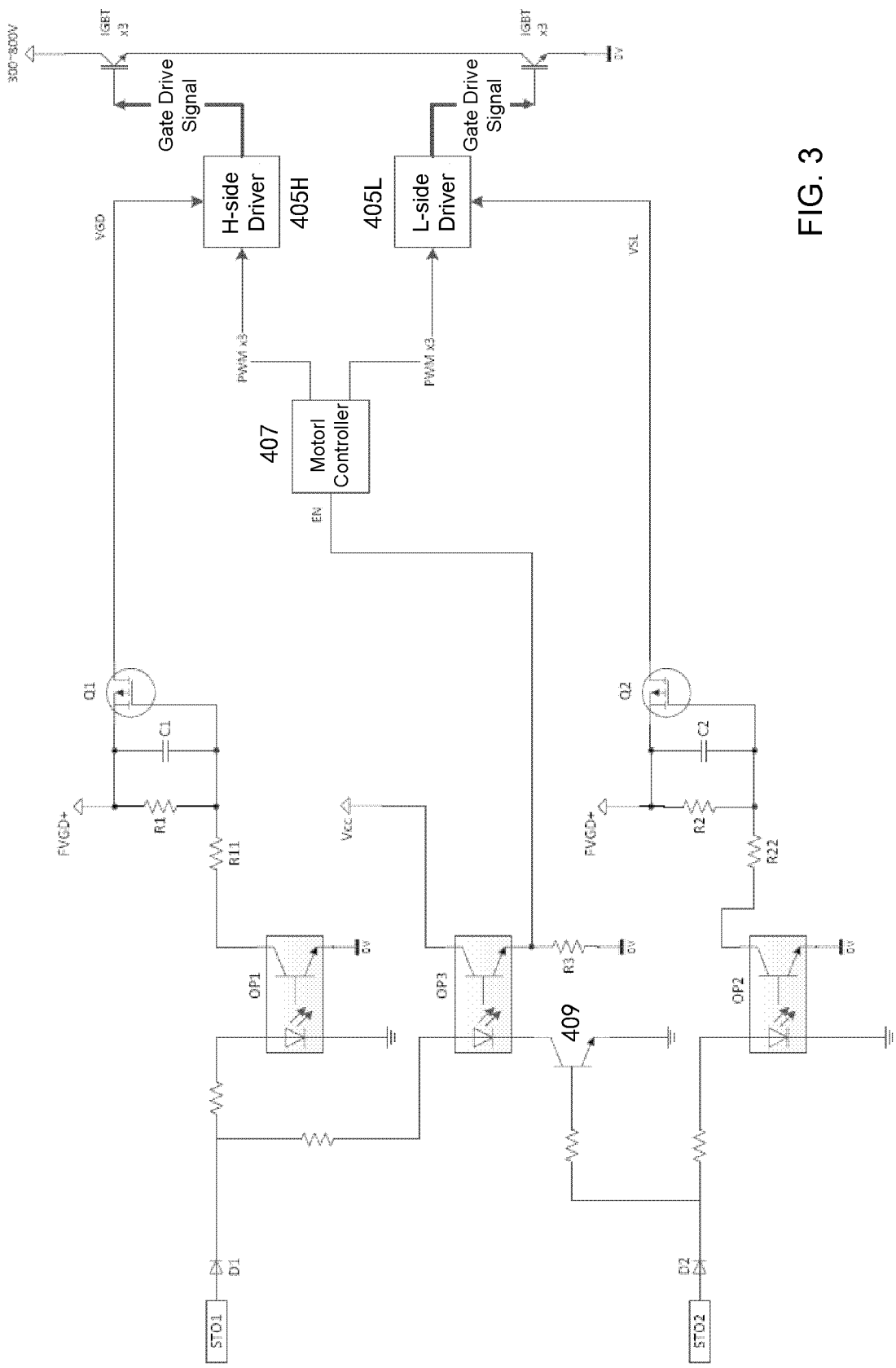
FIGS. 3 to 5 are circuit diagrams schematically illustrating circuits with an STO functionality according to embodiments of the present disclosure, respectively.

FIG. 3 is a circuit diagram schematically illustrating a circuit with an STO functionality according to an embodiment of the present disclosure.

As shown in FIG. 3, the circuit according to the embodiment has a three-channel arrangement of STO, including a first optocoupler OP1, a second optocoupler OP2 and a third optocoupler OP3. The third optocoupler OP3 has a primary side LED, which may have an anode connected to receive a first STO signal STO1, and a cathode grounded through a switching device 409 (e.g., an NPN transistor). A second STO signal STO2 may be connected to a control terminal (e.g., a base terminal) of the switching device 409. In this example, the first STO signal STO1 may be regarded as a power supply to the primary side LED of the third optocoupler OP3, the primary side LED of the third optocoupler OP3 is connected between the power supply STO1 and the ground, and the switching device 409 (between the cathode of the primary side LED of the third optocoupler OP3 and the ground) may, based on the second STO signal STO2, turn on or off the circuit path where the primary side LED of the third optocoupler OP3 is located. In this way, the primary side LED of the third optocoupler OP3 may be turned off in response to either or both of the first STO signal STO1 and the second STO signal STO2 being enabled. For example, the third optocoupler OP3 may be turned off due to the absence of the power supply when the first STO signal STO1 is enabled, or due to cutting-off of a connection to the ground when the second STO signal STO2 is enabled. Thus, an AND operation of signal levels of the first STO signal STO1 and the second STO signal STO2 is implemented. There are various circuits to perform the AND operation, and the circuit shown in FIG. 3 is merely illustrative.

In this example, Zener diodes D1 and D2 of, for example, 15V are connected at signal inputs of STO1 and STO2, respectively. The Zener diodes D1 and D2 are provided to set a stable STO trigger threshold voltage.

The first optocoupler OP1 may have a secondary side transistor, with one end pulled up to a supply voltage FVGD+, and the other end grounded. In addition, in this example, a low-pass filter circuit is connected at an output of the secondary side transistor, so as to provide a stable output. In this example, an RC low-pass filter circuit consisting of a resistor R11 and a capacitor C1 is illustrated, to provide a filtered output across the capacitor C1. In addition, a resistor R1 may also be connected across the capacitor C1 to provide a discharge path for the capacitor C1 (the resistor R1 serves as a load of the RC low pass filter circuit). There are various low-pass filter circuits in the art, and the circuit shown in FIG. 3 is merely illustrative.

A first switching device Q1 (e.g., PMOSFET) is connected between the supply voltage FVGD+ and a high-side driver 405H, and the filtered output from the secondary side of the first optocoupler OP1 may control on/off of the first switching device Q1. When the first switching device Q1 is turned on, the supply voltage FVGD+ may be provided as a power supply VGD to the high-side driver 405H. The high-side driver 405H, with the power supply VGD, may output a gate drive signal for a high-side IGBT based on a drive control signal such as a PWM signal from a motor controller 407.

The second optocoupler OP2 may have a secondary side transistor similarly connected, with one end pulled up to the supply voltage FVGD+, and the other grounded. Similarly, a low-pass filter circuit, such as an RC low-pass filter circuit consisting of a resistor R22 and a capacitor C2, may be connected at an output of the secondary side transistor, and a resistor R2 may be connected as a load across the capacitor C2. Detailed descriptions thereof will be omitted here.

A second switching device Q2 (e.g., PMOSFET) is connected between the supply voltage FVGD+ and a low-side driver 405L, and the filtered output from the secondary side of the second optocoupler OP2 may control on/off of the second switching device Q2. When the second switching device Q2 is turned on, the supply voltage FVGD+ may be provided as a power supply VSL to the low-side driver 405L. The low-side driver 405L, with the power supply VSL, may output a gate drive signal for a low-side IGBT based on a drive control signal such as a PWM signal from the motor controller 407.

The third optocoupler OP3 may have a secondary side, with one end connected to a power supply voltage Vcc, and the other end grounded through a resistor R3. An output signal (e.g., a voltage at an emitter) of the secondary side of the third optocoupler OP3 is at a high level during normal operation (in which case the motor controller 407 should normally provide the drive control signals), or at a low level when the STO is triggered (e.g., either or both of STO1 and STO2 are enabled) (in which case the motor controller 407 stops providing the drive control signals). That is, the output signal of the secondary side of the third optocoupler OP3 has the same enable logic as the motor controller 407. Therefore, the output signal of the secondary side of the third optocoupler OP3 may be connected to an enable terminal EN of the motor controller 407.

When the STO is triggered (e.g., at least one of the STO1 and STO2 is enabled), the corresponding one(s) of the first and second optocouplers OP1 and OP2 and also the third optocoupler OP3 are both/all turned off, and their respective secondary side transistors are both/all turned off. In the STO channel where the off one of the first optocoupler OP1 and the second optocoupler OP2 is located, the capacitor C1 or C2 may be discharged through the resistor R1 or R2. When the voltage across the capacitor C1 or C2 drops below a threshold voltage of the switching device Q1 or Q2, the switching device Q1 or Q2 may be turned off. Since the switching device Q1 or Q2 is turned off, the high-side driver 405H or the low-side driver 405L will not receive the power supply VGD or VSL and thus stop operating, so that a torque of the motor may be turned off. In addition, in the third STO channel where the third optocoupler is located, the secondary side of the third optocoupler is turned off so that its output signal is pulled down to the ground, and thus the enable terminal EN of the motor controller 407 may be pulled down to the ground voltage, resulting in interruption of providing the drive control signals to the high-side driver 405H and the low-side driver 405L, which therefore stops driving the motor to rotate.

In this example, in the third STO channel, the motor controller 407 is controlled by the enable terminal EN, instead of the switching device as shown in FIG. 2. However, the present disclosure is not limited thereto. For example, switching devices may be provided between the motor controller 407 and the high-side driver 405H and between the motor controller 407 and the low-side driver 405L, respectively, and controlled based on the output signal of the secondary side of the third optocoupler.

Figure 4:
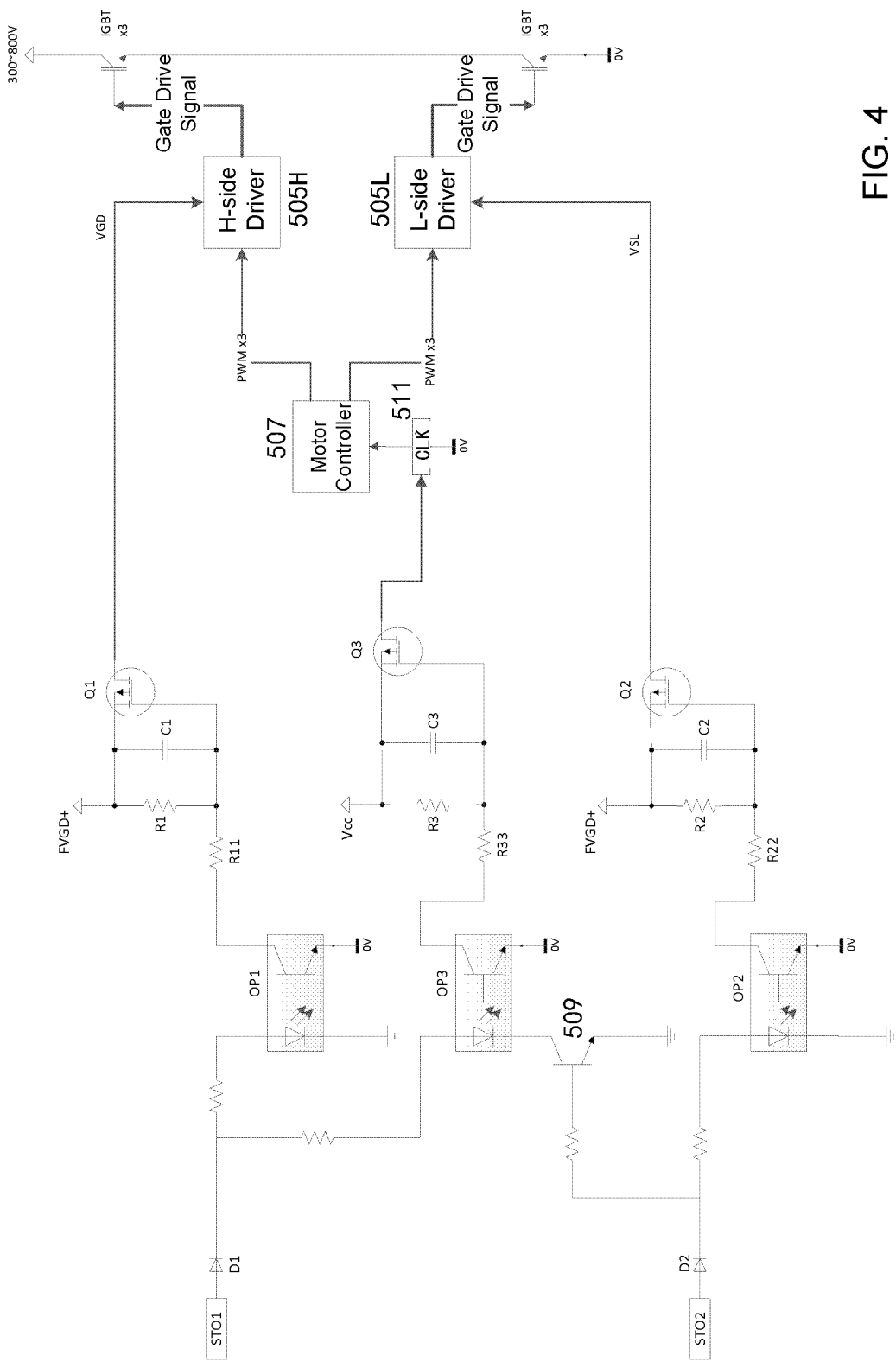

FIG. 4 is a circuit diagram schematically illustrating a circuit with an STO functionality according to an embodiment of the present disclosure.

As shown in FIG. 4, the STO circuit according to the embodiment is a three-channel arrangement of STO, including a first optocoupler OP1, a second optocoupler OP2, and a third optocoupler OP3. Connections of the optocouplers on their respective primary and secondary sides are the same as those described above in conjunction with FIG. 3 and will not be described herein again. In addition, similarly to the first optocoupler OP1 and the second optocoupler OP2, on the secondary side of the third optocoupler OP3, an RC low-pass filter circuit consisting of, for example, a resistor R33 and a capacitor C3 is also provided, and a resistor R3 may be connected as a load across the capacitor C3. In addition, regarding a switching device 509, a motor controller 507, a high-side driver 505H, and a low-side driver 505L illustrated in the figure, reference may be made to the above descriptions of the corresponding components.

In this example, the output signal of the secondary side of the third optocoupler OP3 is not connected to the enable terminal of the motor controller, but is connected to a clock generator 511 which is connected to the motor controller 507. The clock generator 511 may generate a clock signal CLK based on, for example, a crystal oscillator. The motor controller 507 may generate a drive control signal such as a PWM signal based on the clock signal CLK. A third switching device Q3 (e.g., PMOSFET) may be connected between a power supply voltage Vcc (power supply to the clock generator) and a power supply terminal of the clock generator 511, and the filtered output of the secondary side of the third optocoupler OP3 may control on/off of the third switching device Q3. When the third switching device Q3 is turned on, the power supply voltage Vcc may be transferred to the clock generator 511, and thus the clock generator 511 may operate to generate the clock signal CLK. On the other hand, when the third switching device Q3 is turned off, the clock generator 511 is powered off so as not to generate the clock signal CLK, and thus the motor controller 507 stops supplying the drive control signals.

Examples where the three-channel STO functionality is achieved by controlling the operation of the motor controller are described above in conjunction with FIGS. 3 and 4. It is apparent for the ordinary skilled in the art that there are many different ways to control the operation of the motor controller.

Figure 5:
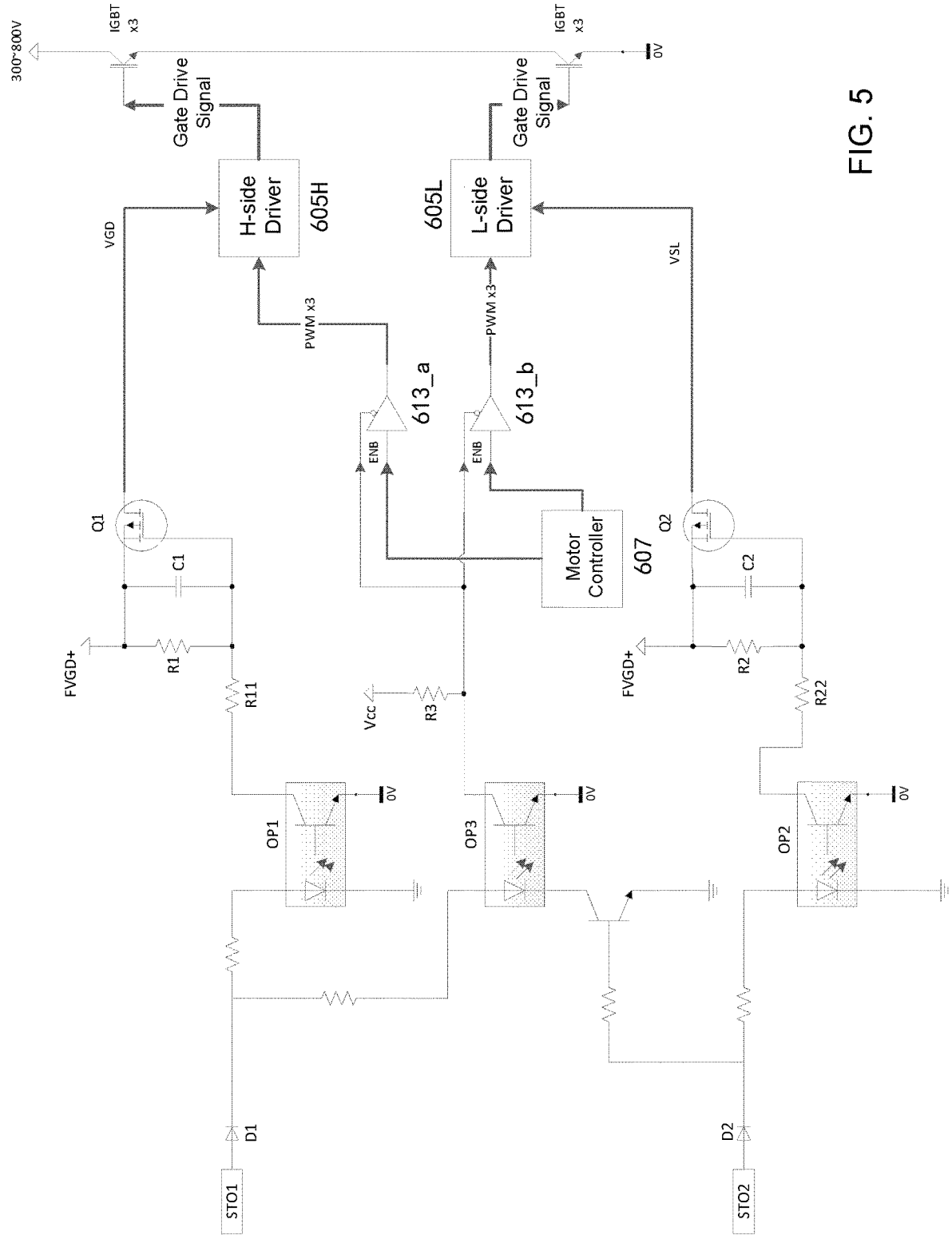

FIG. 5 is a circuit diagram schematically illustrating a circuit with an STO functionality according to an embodiment of the present disclosure.

As shown in FIG. 5, the STO circuit according to the embodiment is a three-channel arrangement of STO, including a first optocoupler OP1, a second optocoupler OP2, and a third optocoupler OP3. Connections of the optocouplers on their respective primary and secondary sides are the same as those described above in conjunction with FIG. 3 and will not be described herein again. The secondary side of the third optocoupler OP3 has one end pulled up to a power supply voltage Vcc through a resistor R3, and the other end grounded. An output signal (e.g., a voltage at a collector) of the secondary side of the third optocoupler OP3 is at a low level during normal operation or at a high level when the STO is triggered (e.g., either of the STO1 and STO2 is enabled). In addition, regarding a motor controller 607, a high-side driver 605H, and a low-side driver 605L illustrated in the figure, reference may be made to the above descriptions of the corresponding components.

In this example, a transfer gate, instead of a transistor, is used as the third switching device. For example, a first transfer gate 613_a may be connected between the motor controller 607 and the high-side driver 605H, and a second transfer gate 613_b may be connected between the motor controller 607 and the low-side driver 605L. The first transfer gate 613_a and the second transfer gate 613_b, when enabled, may transfer drive control signals generated by the motor controller 607 to the high-side driver 605H and the low-side driver 605L, respectively. The output of the secondary side of the third optocoupler OP3 may be connected to an enable terminal ENB of each of the first and second transfer gates 613_a and 613_b. Here, the enable terminal ENB may be active at a low level. When the secondary side of the third optocoupler OP3 is turned on, the first and second transfer gates 613_a and 613_b may have their respective enable terminals ENB pulled down to the ground voltage, and thus be enabled to transfer the drive control signals. On the other hand, when the secondary side of the third optocoupler OP3 is turned off, the first and second transfer gates 613_a and 613_b may have their respective enable terminals ENB pulled up to the power supply voltage Vcc, and thus disabled so as not to transfer the drive control signals.

The arrangements and working principles of the three channels of STO according to the inventive concept are described above with reference to FIGS. 3-5 by way of example. However, the present disclosure is not limited thereto. For example, it is not necessary for the first and second STO channels to control the high-side and low-side drivers, or for the third STO channel to control the motor controller. Instead, by adaptively adjusting the circuit topology, it is also possible for the first STO channel to control the low-side driver or the motor controller, the second STO channel to control the high-side driver or the motor controller, or the third STO channel to control the high-side or low-side driver. In summary, a three-channel configuration in which the AND operation of two STO signals is used as an input to the third STO channel, and from which an output controls the supply of the drive control signal, should fall within the scope of the present disclosure.

Figure 6:
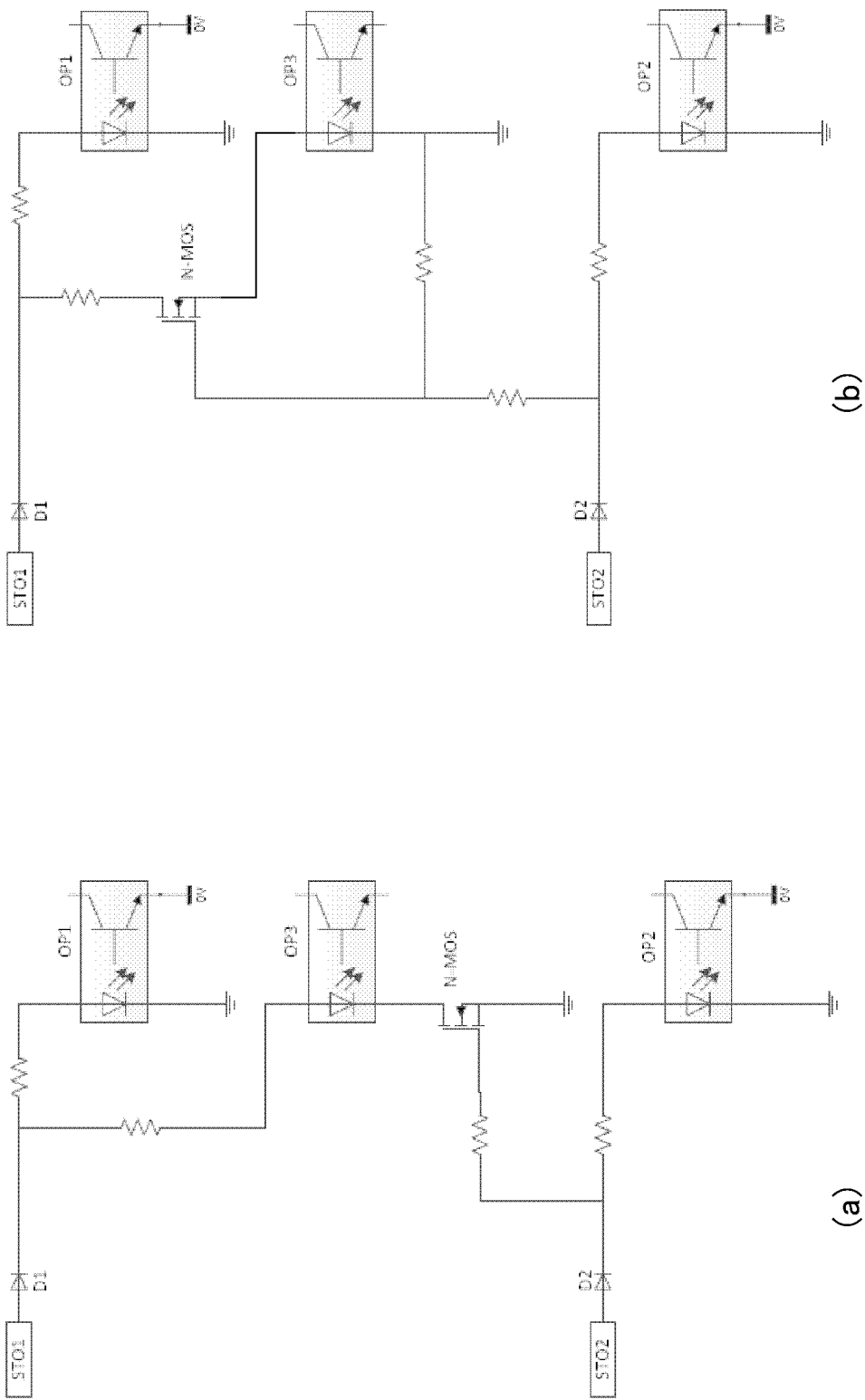
FIG. 6 is a diagram schematically illustrating various circuits performing an AND operation on level signals according to embodiments of the present disclosure.
Figure 6:
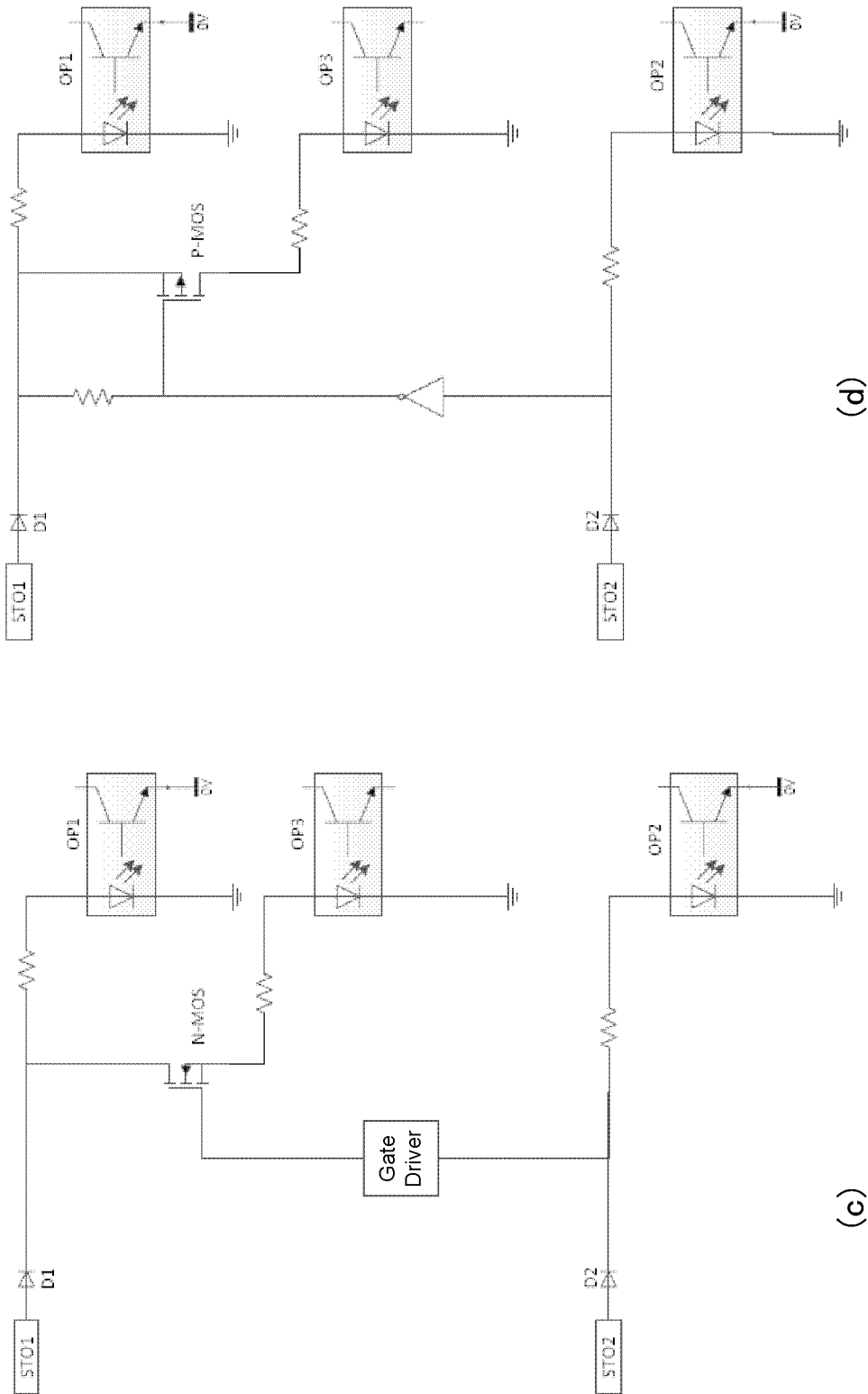
Figure 6:
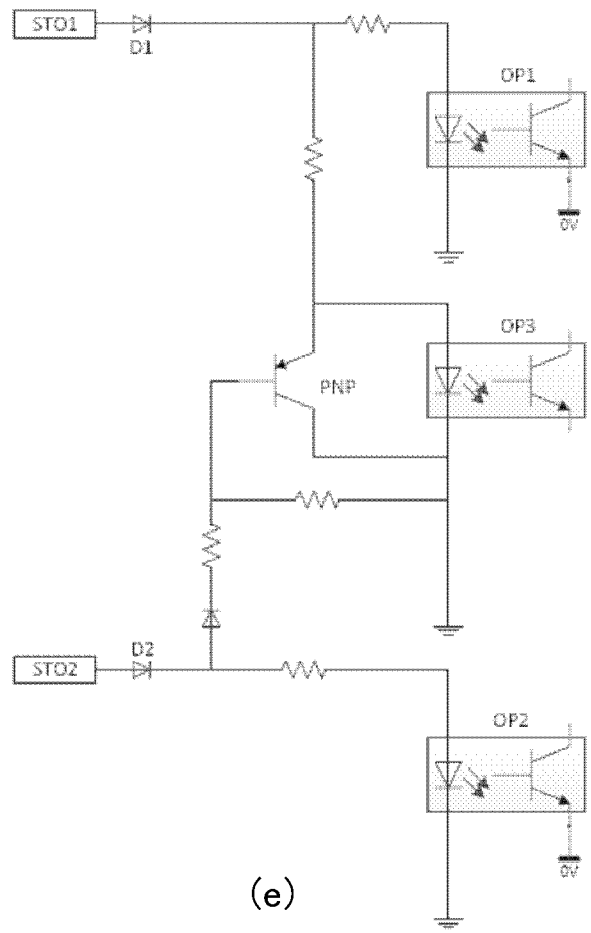

FIG. 6 is a diagram schematically illustrating various circuits performing an AND operation on level signals according to embodiments of the present disclosure.

As shown in FIG. 6(a), the switching device 409 shown in FIG. 3 may be implemented with a different type of switching device, such as an N-type metal oxide semiconductor (NMOS) transistor.

In the examples shown in FIGS. 3 and 6(a), the switching device is connected to the cathode of the primary side of the third optocoupler OP3. However, the present disclosure is not limited thereto. For example, the switching device may be connected to the anode of the primary side of the third optocoupler OP3. As shown in FIG. 6(b), the primary side LED of the third optocoupler OP3 may have its anode connected to receive the first STO signal STO1 through the switching device (e.g., NMOS), and its cathode connected to the ground. The second STO signal STO2 may be connected to control a control terminal of the switching device. In this example, the first STO signal STO1 may also be regarded as a power supply to the primary side LED of the third optocoupler OP3, the primary side LED of the third optocoupler OP3 is connected between the power supply STO1 and the ground, and the switching device (between the power supply STO1 and the anode of the primary side LED of the third optocoupler OP3) may turn on or off the circuit path where the primary side LED of the third optocoupler OP3 is located based on the second STO signal STO2.

Alternatively, instead of directly controlling the control terminal of the switching device by the second STO signal STO2, a gate driver may be used. As shown in FIG. 6(c), the primary side LED of the third optocoupler OP3 may have its anode connected to receive the first STO signal STO1 through the switching device (e.g., NMOS), and its cathode connected to the ground. The second STO signal STO2 may be connected to control the gate driver, which may in turn drive a gate of the switching device. When the second STO signal STO2 is not enabled (e.g., at a high level), the gate driver may operate to drive the switching device to be turned on; and when second STO signal STO2 is enabled (e.g., at a low level or in an open state), the gate driver may stop operating such that the switching device is turned off.

In the above embodiments, the switching device is implemented by NMOS. However, the present disclosure is not limited thereto. For example, as shown in FIG. 6(d), the switching device may be implemented by a P-type metal oxide semiconductor (PMOS) transistor. Since the PMOS has inverted driving logic as compared to the NMOS, in this example the second STO signal STO2 may drive a gate of the PMOS by means of, for example, an inverter and a resistor connected between it and the power supply STO1. Certainly, the circuit that drives a PMOS transistor based on the second STO signal STO2 is not limited thereto.

In the above embodiments, the circuit path where the primary side LED of the third optocoupler OP3 is located (between the power supply STO1 and the ground) is controlled by the switching device. However, the present disclosure is not limited thereto. For example, as shown in FIG. 6 (e), a bypass branch connected between the first STO signal STO1 (power supply) and the ground may be provided in parallel with the primary side LED of the third optocoupler OP3. The bypass branch may include a switching device such as a PNP transistor, and the second STO signal STO2 may be connected to control a control terminal of the switching device. Here, the second STO signal STO2 may be connected to turn off the switching device when not enabled (e.g., at a high level) to make the primary side LED of the third optocoupler OP3 operate normally, and to turn on the switching device when enabled (e.g., at a low level or in an open state) to make the primary side LED of the third optocoupler OP3 be short-circuited and stop operating.

In the various circuits to perform the AND logic, the first STO signal STO1 and the second STO signal STO2 are interchangeable.

Figure 7:
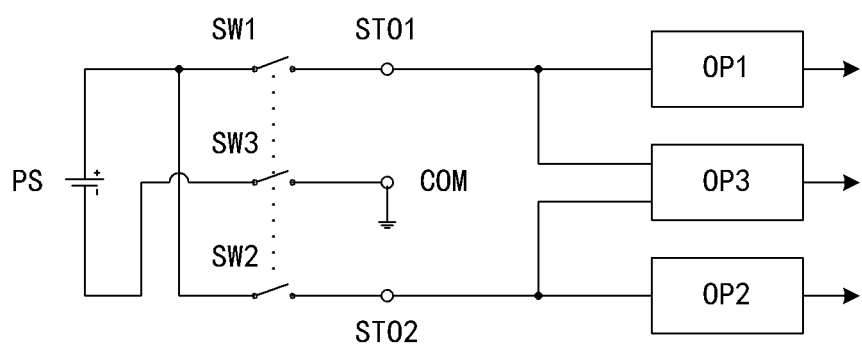
FIG. 7 is a schematic diagram illustrating an input portion of a circuit with an STO functionality according to an embodiment of the present disclosure.

FIG. 7 is a schematic diagram illustrating an input portion of a circuit with an STO functionality according to an embodiment of the present disclosure. As shown in FIG. 7, the STO signals may be provided by a power supply PS (e.g., a 24V DC power supply). Here, a first switch SW1 and a second switch SW2 are provided to control input of the first STO signal STO1 and the second STO signal STO2 to the first optocoupler OP1 and the second optocoupler OP2, respectively. In addition, a third switch SW3 is also provided to control grounding (e.g., in this example, connecting to a negative electrode of the power supply PS) of the circuit. Components (for example, the components described in the above embodiments) in the circuit may be commonly connected to a ground COM. The first switch SW1, the second switch SW2, and the third switch SW3 may be turned on or off together. In this example, the three switches are provided in correspondence with three channels. Therefore, a three-channel architecture is implemented not only inside the circuit but also at an input of the circuit, and thus it is possible to tolerate 2 failures inside or outside the circuit while the STO functionality still works, resulting in greatly improved security and reliability.

In FIG. 7, the AND gate and parts of the circuit downstream the optocouplers are not shown for the sake of convenience only. It is to be noted that the configuration shown in FIG. 7 is applicable to the various circuit configurations described above.

As described above, the circuit having the STO functionality according to embodiments of the present disclosure may be applied to a frequency converter, to achieve higher reliability.

The embodiments of the present disclosure have been described above. However, these embodiments are provided for illustrative purposes only, and are not intended to limit the scope of the present disclosure. The mere fact that the above embodiments are described separately does not necessarily mean that measures in those embodiments cannot be used in combination to advantage. The scope of the present disclosure is defined by the claims and also equivalents thereof. Various substitutions and modifications can be made without departing from the scope of the present disclosure, and all such substitutions and modifications should fall within the scope of the present disclosure.

What is claimed is:

1. A circuit with a Safe-Torque-Off (STO) functionality, comprising:
a first STO channel configured to control on/off of power supply to a high-side driver of a frequency converter based on a first STO signal;
a second STO channel configured to control on/off of power supply to a low-side driver of the frequency converter based on a second STO signal; and
a third STO channel configured to control supply of a drive control signal from a controller of the frequency converter to the high-side driver and the low-side driver based on a result of a logical operation of the first STO signal and the second STO signal,
wherein the logical operation is configured to make the result active in response to at least one of the first and second STO signals being active,
wherein the first STO channel comprises:
a first isolation device comprising a first primary side and a first secondary side, wherein the first primary side is configured to receive the first STO signal; and
a first switching device connected between a power supply of the high-side driver and the high-side driver and configured to be turned on or off under control of the first secondary side,
wherein the first secondary side is connected in such a manner that the first switching device is turned off in response to the first STO signal being active, and
wherein the second STO channel includes:
a second isolation device comprising a second primary side and a second secondary side, wherein the second primary side is configured to receive the second STO signal; and
a second switching device connected between a power supply of the low-side driver and the low-side driver and configured to be turned on or off under control of the second secondary side,
wherein the second secondary side is connected in such a manner that the second switching device is turned off in response to the second STO signal being active.

2. The circuit according to claim 1, wherein the third STO channel comprises:
a third isolation device comprising a third primary side and a third secondary side, wherein the third primary side is configured to receive the result of the logical operation of the first STO signal and the second STO signal,
wherein the third secondary side is connected in such a manner that the supply of the drive control signal is stopped in response to at least one of the first STO signal and the second STO signal being active.

3. The circuit according to claim 2, wherein,
the third primary side is connected between the first STO signal and ground to form a current path from the first STO signal to the ground via the third primary side, and
the circuit further comprises a grounding switching device arranged in the current path, a control terminal of the grounding switching device being controlled by the second STO signal.

4. The circuit according to claim 3, wherein the grounding switching device is connected between the first STO signal and the third primary side, or between the third primary side and the ground.

5. The circuit according to claim 3, further comprising:
a gate driver connected to the control terminal of the grounding switching device, wherein operation of the gate driver is controlled by the second STO signal.

6. The circuit according to claim 2, wherein,
the third primary side is connected between the first STO signal and ground to form a current path from the first STO signal to the ground via the third primary side, and
the circuit further comprises a bypass branch in parallel with the current path, the bypass branch being controlled by the second STO signal.

7. The circuit according to claim 6, wherein the bypass branch comprises a bypass switching device, a control terminal of the bypass switching device being controlled by the second STO signal.

8. The circuit according to claim 2, wherein an output from the third secondary side is connected to an enable terminal of the controller.

9. The circuit according to claim 8, wherein,
the third isolation device comprises an optocoupler, and
the third secondary side has one end connected to a first power supply and the other end connected to a ground voltage through a resistor, wherein an output voltage at the other end is connected to the enable terminal of the controller.

10. The circuit according to claim 2, wherein the third STO channel further comprises:
a third switching device connected between the controller and the high-side and low-side drivers and configured to be turned on or off under control of the third secondary side.

11. The circuit according to claim 10, wherein the third switching device comprises:
a first transfer gate connected between the controller and the high-side driver and configured to transfer the drive control signal from the controller to the high-side driver; and
a second transfer gate connected between the controller and the low-side driver and configured to transfer the drive control signal from the controller to the low-side driver,
wherein an output from the third secondary side is connected to enable terminals of the first transfer gate and the second transfer gate, respectively.

12. The circuit according to claim 11, wherein,
the third isolation device comprises an optocoupler, and
the third secondary side has one end connected to a first power supply through a resistor and the other end connected to a ground voltage, wherein an output voltage at the one end of the third secondary side is connected to the enable terminals of the first transfer gate and the second transfer gate, respectively.

13. The circuit according to claim 2, wherein an output from the third secondary side is connected to a clock generator configured to provide a clock signal to the controller.

14. The circuit according to claim 13, further comprising:
a third switching device connected between a power supply of the clock generator and the clock generator and configured to be turned on or off under control of the third secondary side,
wherein the third secondary side is connected in such a manner that the third switching device is turned off in response to at least one of the first STO signal and the second STO signal being active.

15. The circuit according to claim 1, further comprising:
an AND gate consisting of discrete components and configured to perform the logical operation.

16. The circuit according to claim 1, further comprising:
a first switch configured to control whether or not to input the first STO signal to the first STO channel;
a second switch configured to control whether or not to input the second STO signal to the second STO channel; and
a third switch configured to control whether or not to ground the circuit.

17. A frequency converter comprising the circuit according to claim 1.

18. A circuit with a Safe-Torque-Off (STO) functionality, comprising: three STO channels configured to receive a first STO signal, a second STO signal, and a signal obtained by a logical operation of the first STO signal and the second STO signal, respectively, and to control power supply to a high-side driver, power supply to a low-side driver, and supply of a drive control signal in a frequency converter based on the received signals, respectively, wherein the logical operation is configured to make the signal obtained by the logical operation active in response to at least one of the first STO signal and the second STO signal being active, and wherein the drive control signal is provided by a controller of the frequency converter to the high-side driver and the low-side driver,
wherein the third STO channel comprises:
a third isolation device comprising a third primary side and a third secondary side, wherein the third primary side is configured to receive the result of the logical operation of the first STO signal and the second STO signal,
wherein the third secondary side is connected in such a manner that the supply of the drive control signal is stopped in response to at least one of the first STO signal and the second STO signal being active.

* * * * *